United States Patent
Koshimizu et al.

(10) Patent No.: US 10,645,736 B2
(45) Date of Patent: May 5, 2020

(54) RADIO COMMUNICATION SYSTEM AND RADIO COMMUNICATION METHOD

(71) Applicant: NTT DOCOMO, INC., Tokyo (JP)

(72) Inventors: Takashi Koshimizu, Tokyo (JP); Syed Husain, Chicago, IL (US); Malla Reddy Sama, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/313,358

(22) PCT Filed: May 10, 2017

(86) PCT No.: PCT/JP2017/017656
§ 371 (c)(1),
(2) Date: Dec. 26, 2018

(87) PCT Pub. No.: WO2018/003302
PCT Pub. Date: Jan. 4, 2018

(65) Prior Publication Data
US 2019/0166633 A1 May 30, 2019

(30) Foreign Application Priority Data
Jul. 1, 2016 (JP) ................................ 2016-131698

(51) Int. Cl.
*H04W 76/11* (2018.01)
*H04W 8/26* (2009.01)
(Continued)

(52) U.S. Cl.
CPC ......... *H04W 76/11* (2018.02); *H04L 65/1016* (2013.01); *H04L 65/1063* (2013.01);
(Continued)

(58) Field of Classification Search
CPC ........ H04W 76/11; H04W 8/10; H04W 8/18; H04W 92/06; H04W 8/26; H04L 67/141;
(Continued)

(56) References Cited

U.S. PATENT DOCUMENTS

| 8,824,410 B2 * | 9/2014 | Kunz | .................. H04W 12/001 370/329 |
| 9,392,530 B2 * | 7/2016 | Xie | ........................ H04W 48/08 |

OTHER PUBLICATIONS

International Search Report issued in PCT/JP2017/017656, dated Jul. 11, 2017 (1 page).
(Continued)

*Primary Examiner* — Vinncelas Louis
(74) *Attorney, Agent, or Firm* — Osha Liang LLP

(57) ABSTRACT

A radio communication system includes user equipment; a call control device; a subscriber management device; and a connection device that connects an application server, wherein the subscriber management device includes a subscriber information storage unit that stores subscriber information that associates a first identifier for identifying the user equipment in the radio communication system with a second identifier for identifying the user equipment in the application server, wherein the call control device includes a first context storage unit and a first communication processing unit that transmits the first identifier, the second identifier, and a call control device identifier to the connection device, and wherein the connection device includes a second context storage unit and a second communication processing unit that reports, to the application server, that the second identifier is activated.

11 Claims, 12 Drawing Sheets

(51) Int. Cl.
  *H04W 92/06* (2009.01)
  *H04M 3/00* (2006.01)
  *H04L 29/08* (2006.01)
  *H04L 29/06* (2006.01)
  *H04W 8/18* (2009.01)

(52) U.S. Cl.
  CPC .......... *H04L 65/1069* (2013.01); *H04L 67/14* (2013.01); *H04L 67/141* (2013.01); *H04L 67/146* (2013.01); *H04M 3/00* (2013.01); *H04W 8/18* (2013.01); *H04W 8/26* (2013.01); *H04W 92/06* (2013.01)

(58) Field of Classification Search
  CPC ............. H04L 65/1016; H04L 65/1063; H04L 65/1069; H04L 67/146; H04L 67/14; H04M 3/00
  See application file for complete search history.

(56) References Cited

OTHER PUBLICATIONS

Written Opinion of the International Searching Authority issued in PCT/JP2017/017656, dated Jul. 11, 2017 (3 pages).
NTT DOCOMO; "IP based MT Triggering for 3gpp Interworking"; oneM2M-ARC-2013-0575, Dec. 9-13, 2013 (5 pages).
Huawei, et al.; "Solution 4.X: On-demand SM setup"; 3GPP TSG SA WG2 Meeting #115, S2-162936; Nanjing, China, May 23-27, 2016 (3 pages).
3GPP TR 23.799 V0.5.0; "3rd Generation Partnership Project; Technical Specification Group Services and System Aspects; Study on Architecture for Next Generation System (Release 14)"; May 2016 (178 pages).

* cited by examiner

FIG.8

SUBSCRIBER INFORMATION

| Ext-ID | Int-ID | STATUS | AS INFORMATION | APP ID | UE policy |
|---|---|---|---|---|---|
| Ext-ID1 | Int-ID1 | Not Activated | AS1-ID | APP1 | xx |
| Ext-ID2 | Int-ID2 | Activated | AS1-ID | APP2 | yy |
| ... | ... | ... | ... | ... | ... |

FIG.9

CPF_UE CONTEXT

| Int-ID | AS INFORMATION | APP ID | UE policy | UE type | NIWF-ID | UE ADDRESS | UPF ADDRESS |
|---|---|---|---|---|---|---|---|
| Int-ID1 | AS1-ID | APP1 | xx | MTC Type | NIWF1 | aa.aa.aa.aa | cc.cc.cc.cc |
| Int-ID2 | AS1-ID | APP2 | yy | MBB Type | NIWF1 | bb.bb.bb.bb | dd.dd.dd.dd |
| ... | ... | ... | ... | ... | ... | ... | ... |

FIG.10

| NIWF_UE CONTEXT | | | | | |
|---|---|---|---|---|---|
| Ext-ID | Int-ID | CPF-ID | AS INFORMATION | APP ID | UE policy |
| Ext-ID1 | Int-ID1 | CPF1-ID | AS1-ID | APP1 | xx |
| Ext-ID2 | Int-ID2 | CPF2-ID | AS1-ID | APP2 | yy |
| ... | ... | ... | ... | ... | ... |

RADIO COMMUNICATION SYSTEM AND RADIO COMMUNICATION METHOD

TECHNICAL FIELD

The present invention relates to a radio communication system and a radio communication method.

BACKGROUND ART

In long term evolution (LTE), in order to achieve a higher system capacity, a higher data transmission rate, reduction of latency in a radio section, etc., a radio communication scheme called 5G has been studied.

In parallel with the study of the 5G radio communication scheme, a radio communication system that supports a 5G radio access technology (new radio access technology (RAT)), an evolved E-UTRA (evolved E-UTRA), an access technology other than that of 3GPP (a non-3GPP access type), etc., have also been studied (for example, see Non-Patent Document 1). According to Non-Patent Document 1, the radio communication system is referred to as a "next generation system." The next generation system includes a next generation core network.

For the next generation system, similar to the existing LTE, it has been studied to establish a Protocol Data Unit (PDU) session between user equipment and an external network (an external network connected to the outside the next generation network), and to transmit and receive user data using the established PDU session.

In the existing LTE, user equipment attached to a core network (EPC: Evolved Packet Core) is required to always maintain at least one established PDU session. The next generation core network has been studied under the assumption that various types of units of user equipment are supported, such as terminals, e.g., IoT devices, that transmit and receive only a small amount of data at a low frequency and terminals, e.g., smartphones, that frequently transmit and receive a large amount of data.

Thus, in order to support the various types of units of user equipment, the next generation system has been studied such that, after the attach has been completed, user equipment UE establishes a PDU session depending on necessity. Furthermore, since a state exists in the next generation system such that the attach has been completed and no PDU session is established, a system has been studied which is for a server located in an external network to trigger user equipment to establish a PDU session.

FIG. 1 is a diagram illustrating a network triggered on-demand SM setup procedure proposed for 3GPP. An application server (AS) is a server which is located in the external network. A network inter work function (NIWF) is a device that connects the next generation system with the external network. A home subscriber server (HSS) is a server that stores subscriber information. A control plane function (CPF) is a device that processes a call control signal (a C-plane signal). An access network (AS) is a radio network including a base station.

PRIOR ART DOCUMENT

Non-Patent Document

Non-Patent Document 1: 3 GPP TR 23.799 V 0.5.0 (2016-05)

SUMMARY OF THE INVENTION

Problem to be Solved by the Invention

There is a need for a technique that allows a PDU session triggered from an application server side to be more appropriately established in a radio communication system including user equipment, a call control device that processes signals used for call control, a subscriber management device that manages subscriber information, and a connection device that is for connecting an application server.

Means for Solving the Problem

A radio communication system according to the disclosed technology is a radio communication system including user equipment, a call control device that processes a signal used for call control, a subscriber management device that manages subscriber information, and a connection device that establishes a connection with an application server, wherein the subscriber management device includes a subscriber information storage unit that stores subscriber information that associates a first identifier for identifying the user equipment in the radio communication system with a second identifier for identifying the user equipment in the application server, wherein the call control device includes a first context storage unit that stores first context information and a first communication processing unit that acquires the second identifier corresponding to the first identifier received from the user equipment from the subscriber management device, causes the first identifier received from the user equipment and the second identifier acquired from the subscriber management device to be associated and stored in the first context information, and transmits the first identifier received from the user equipment, the second identifier acquired from the subscriber management device, and a call control device identifier for identifying the call control device to the connection device, and wherein the connection device includes a second context storage unit that stores second context information that associates the first identifier, the second identifier, and the call control device identifier received from the call control device, and a second communication processing unit that reports, to the application server, a notification indicating that the second identifier is activated.

Advantage of the Invention

According to the disclosed technology, a technique is provided that allows a PDU session triggered from an application server side to be more appropriately established in a radio communication system including user equipment, a call control device that processes signals used for call control, a subscriber management device that manages subscriber information, and a connection device that is for connecting an application server.

BRIEF DESCRIPTION OF DRAWINGS

FIG. 8 is a diagram illustrating an example of subscriber information;

FIG. 9 is a diagram illustrating an example of a CPF_UE context;

FIG. 10 is a diagram illustrating an example of a NIWF_UE context;

EMBODIMENTS OF THE INVENTION

Since an AS is located outside the next generation system, the AS may not aware of an ID that uniquely identifies user equipment in the next generation system (which is referred to as an "Int-ID," hereinafter, and which is, for example, an international mobile subscriber identity (IMSI), etc.). Accordingly, in a procedure illustrated in FIG. 1, an AS transmits an ID for uniquely identifying user equipment in an external network (which is referred to as an "Ext-ID," hereinafter) to a NIWF (S11), while including the Ext-ID in a PDU Session Request, so as to allow specific user equipment to be triggered to establish a PDU session. Additionally, in the procedure of FIG. 1, information for associating an Int-ID with an Ext-ID is held in the HSS, and the NIWF recognizes the Int-ID by querying the HSS for the Int-ID using the Ext-ID as a key (S13)

Figure 1:
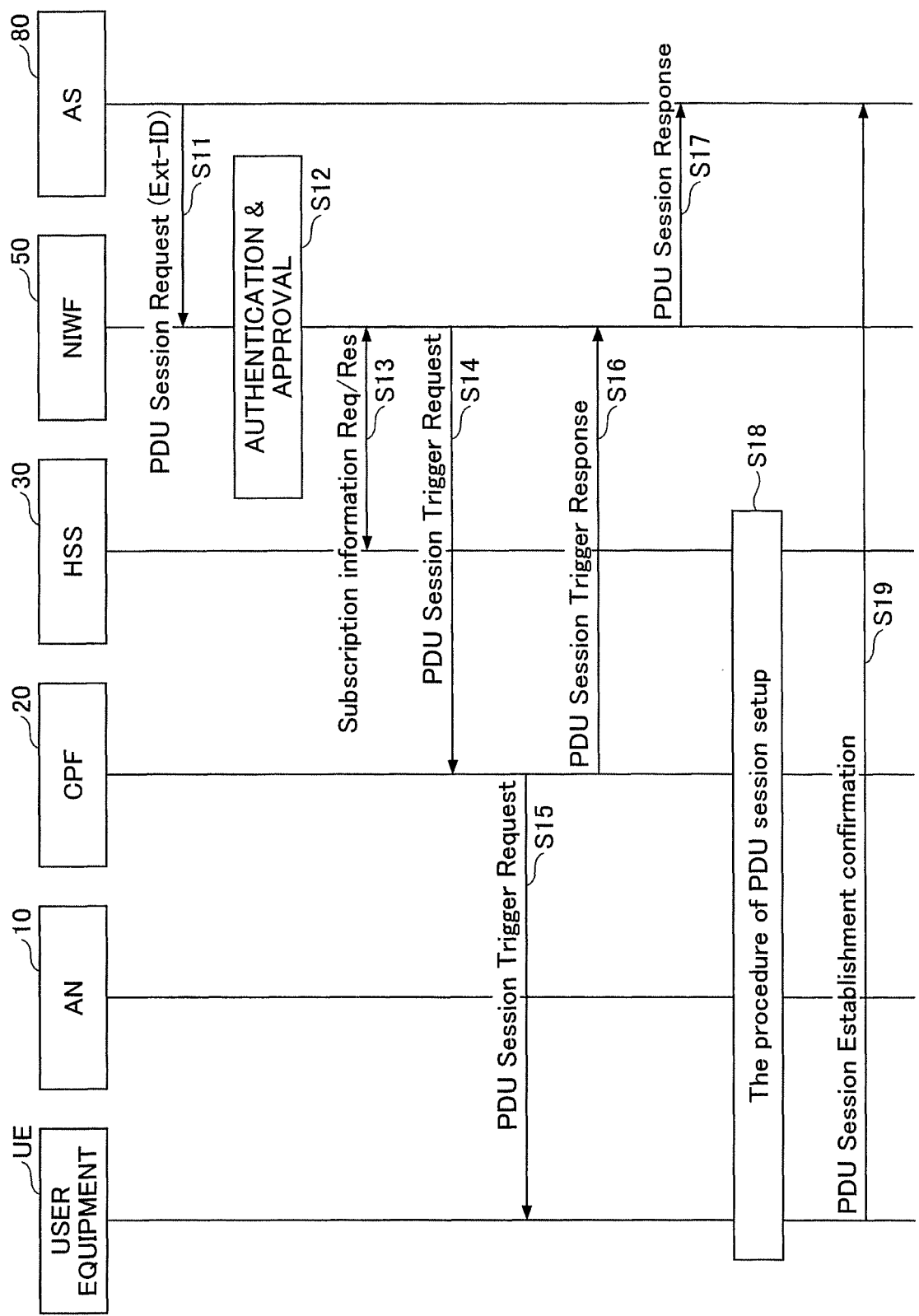
FIG. 1 is a diagram illustrating a network triggered on-demand SM setup procedure which has been proposed to 3GPP.

However, in the procedure illustrated in FIG. 1, the HSS is queried each time a PDU Session Request including an Ext-ID is received from the AS, and, thus, a load on the HSS increases. Furthermore, the AS side may be unable to detect the user equipment that has completed the attach (in other words, which Ext-ID is effective) among the units of user equipment corresponding to a plurality of Ext-IDs retained in the HSS.

In the following, an embodiment of the present invention is described by referring to the drawings. An embodiment to be described below is merely an example, and an embodiment to which the present invention is applied is not limited to the following embodiment. The following description is made under the assumption that an operator network is the above-described next generation system; however, the operator network is not limited to this.

<System Configuration>

Figure 2:
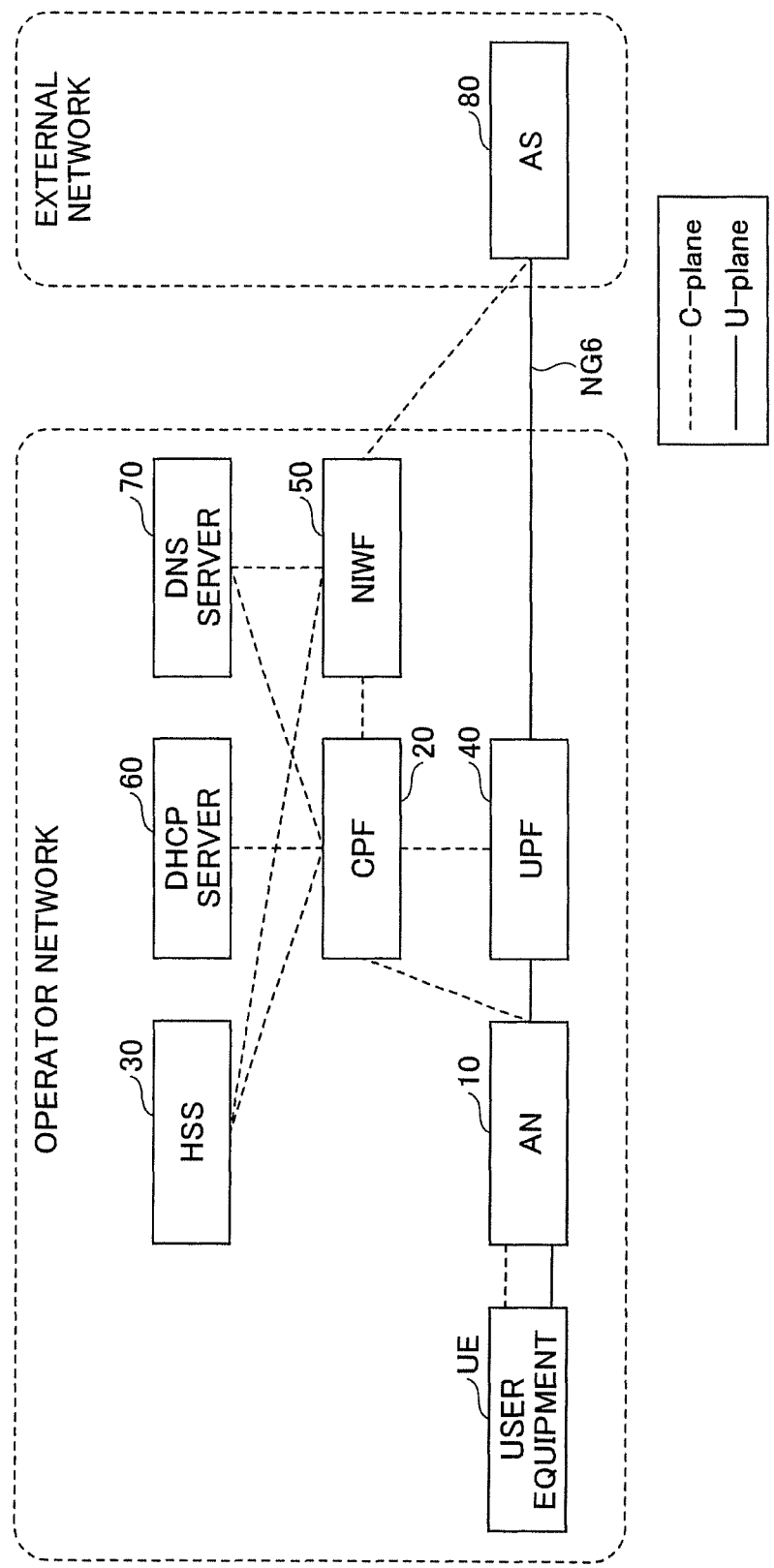
FIG. 2 is a diagram illustrating an exemplary configuration of a radio communication system according to an embodiment.

FIG. 2 is a diagram illustrating an exemplary configuration of a radio communication system according to an embodiment. As illustrated in FIG. 2, the radio communication system according to the embodiment includes user equipment UE, an AN 10, a C-plane Function (CPF) 20, an HSS 30, a U-plane function (UPF) 40, an NIWF 50, a DHCP server 60, a DNS 70, and an AS 80. In FIG. 2, one user equipment UE, one AN 10, one CPF 20, one HSS 30, one UPF 40, one NIWF 50, one DHCP server 60, one DNS 70, and one AS 80 are illustrated; however, there may be a plurality of units of user equipment UE, a plurality of ANs 10, a plurality of CPFs 20, a plurality of HSSs 30, a plurality of UPFs 40, a plurality of NIWFs 50, a plurality of DHCPs server 60, a plurality of DNSs 70, and a plurality of ASs 80.

The user equipment UE, the AN 10, the CPF 20, the HSS 30, the UPF 40, the NIWF 50, the DHCP server 60, and the DNS 70 are associated with the operator network, and the AS 80 is associated with the external network located outside the operator network. For example, an external network is intended to be mainly a public or private data network outside the operator network, but the external network is not limited to that located outside the operator network. For example, a data network operated by an operator of an IP multimedia subsystem (IMS) or the like is also included. Further, according to Non-Patent Document 1, a boundary point between the UPF 40 and the external network is referred to as an "NG6" interface.

The network including the CPF 20, the HSS 30, the UPF 40, the NIWF 50, the DHCP server 60, and the DNS 70 may be referred to as a "next generation core network."

The user equipment UE is a terminal (MTC terminal) that transmits and receives only a small amount of data at a low frequency such as an IoT device, a terminal (mobile broadband (MBB)) terminal that frequently transmits and receives a large amount of data such as a smartphone, or the like, and in the present embodiment, all types of units of user equipment UE are included.

The AN 10 is an access network including a New-RAT, an evolved E-UTRA, an access technology other than 3GPP (for example, a WLAN or a fixed access line), or the like.

The CPF 20 is a device which processes a call control signal (a C-plane signal) and corresponds to a mobile management entity (MME) in LTE. The CPF 20 includes a mobility management (MM) function and a session management (SM) function. The CFP 20 may be referred to as a C-plane network function (CP-NF). The CPF 20 may be divided into a CPF 20 including only the mobility management function and a CPF 20 including only the session management function.

The HSS 30 is a server that stores subscriber information. The HSS 30 may be referred to as a "subscriber data repository."

The UPF 40 is a device that processes the user data (the U-plane signal) and corresponds to a Serving Gateway (SGW) and a packet data network gateway (PGW) in LTE. The UPF 40 has a function of establishing a PDU session for connecting the user equipment UE with the AS 80 in accordance with an instruction of the CPF 20. The UPF 40 may be referred to as UP-GW (U-plane-Gateway).

The Network Inter Work Function (NIWF) 50 is a device that interworks (connects) the operator network with the external network and has a function of performing transmission and reception of the call control signal between the CPF 20 and the AS 80.

The DHCP server 60 has a function of outputting an address to be allocated to the user equipment UE (hereinafter, referred to as a "UE address"). The UE address is intended for an address used in a logical tunnel indicated by the PDU session (that is, an address used for transmission and reception of the user data). In the present embodiment, an IP address is assumed as the UE address, but the UE address is not limited to the IP address (IPv4 or IPv6) and may be a (non-IP) address other than an IP address. This is because in the next generation system, the user data (packet) carried in the PDU session is not limited to IP data (IP packets).

The DNS server 70 is a server that performs name resolution and has a function of resolving IP addresses of various kinds of devices in the operator network.

The AS 80 is a server capable of communicating with the user equipment UE and executing an application that implements a predetermined service. As the AS 80, for example, there are a web server, a server that distributes applications to be executed by the user equipment UE, a server that manages position information of the user equipment UE that distributes applications, various kinds of servers (for example, the P-CSCF or the like) used in the IMS, and the like.

<Operation Overview>

The Ext-ID is an ID uniquely identifying the user equipment UE in the external network. The Ext-ID may be any ID or a mobile subscriber ISDN number (MSISDN).

The Int-ID is an ID uniquely identifying the user equipment UE in the operator network. In other words, in the operator network, the user equipment UE is specified using the Int-ID instead of the Ext-ID. The Int-ID is, for example, the IMSI but not limited thereto and may be an identifier other than the IMSI.

First, in the radio communication system according to the present embodiment, information in which the Int-ID and the Ext-ID are associated in advance is retained in the subscriber information stored in the HSS 30.

Then, in the attach processing procedure, the CPF 20 generates information in which the Int-ID of the user equipment UE, the AS information (information uniquely specifying the AS 80 with which the user equipment UE communicates), and a type of user equipment UE (a UE type) are associated (hereinafter, referred to as a "CPF_UE context"). Further, the NIWF 50 generates information in which the Int-ID and the Ext-ID of the user equipment UE and an identifier uniquely identifying the CPF 20 to which the user equipment UE is attached (hereinafter, referred to as a "CPF-ID") are associated (hereinafter, referred to as "NIWF_UE context"). Then, the NIWF 50 gives a notification indicating that the attach of the user equipment UE has been completed (that is, that the Ext-ID has been activated) to the AS 80.

The AS 80 that has received the notification indicating that the attach of the user equipment UE has been completed transmits a PDU session request signal including the Ext-ID of a specific user equipment UE to the NIWF 50 when performing transmission and reception of data with the specific user equipment UE. The NIWF 50 extracts the Int-ID and the CPF-ID corresponding to the Ext-ID included in the PDU session request signal from the NIWF_UE context, and transmits a PDU session request signal including the Int-ID to the CPF 20 corresponding to the extracted CPF-ID. The CPF 20 performs a process of establishing the PDU session so that communication can be performed between the user equipment UE corresponding to the Int-ID and the AS 80.

Further, when the process of establishing the PDU session is performed, the CPF 20 switches a session establishment procedure in accordance with the type of user equipment UE. For example, for the user equipment UE that has been confirmed to hardly move in advance such as the MTC terminal installed at a fixed position, the CPF 20 directly transmits the session establishment request signal to the UE address output from the DHCP server 60. Further, for the user equipment UE which is supposed to move such as a smartphone, the CPF 20 may transmit a paging message toward a position registration area so that a PDU session establishment process triggered by the user equipment UE as a trigger is started.

Through the processing procedure described above, in the present embodiment, it is possible to implement the PDU session establishment procedure triggered by the external network. Further, when the PDU session request signal including the Ext-ID is received from the AS 80, since the NIWF 50 need not transmit a query about the Int-ID to the HSS 30, it is possible to reduce the load on the HSS 30. Further, since the AS 80 can receive the notification indicating that the attach of the user equipment UE has been completed (that is, that the Ext-ID has been activated) from the NIWF 50, the AS 80 can detect the user equipment that has already performed the attach (that is, the activated Ext-ID).

Further, in the present embodiment, when the session establishment request signal is received from the user equipment UE, the CPF 20 acquires the UE address to be allocated to the user equipment UE from the DHCP server and instructs the UPF 40 to establish the PDU session (the logical tunnel) between the user equipment UE and the AS 80. Further, the CPF 20 transmits a session establishment response message including the acquired UE address to the user equipment UE. Accordingly, in the present embodiment, the PDU session establishment procedure triggered by the user equipment UE can be implemented.

Further, in the present embodiment, when a position update request is received from the user equipment UE, the CPF 20 (a new CPF 20) acquires the CPF_UE context from the CPF 20 (an old CPF 20) to which the user equipment UE has been attached before movement and transmits CPF-ID (the new CPF-ID) of the CPF 20 (the new CPF 20) to the NIWF 50. The NIWF 50 updates the CPF-ID (the old CPF-ID) in NIWF_UE context with the received CPF-ID (the new CPF-ID). Accordingly, in the present embodiment, the position update procedure for the user equipment UE can be implemented.

<Functional Configuration>

Next, an exemplary functional configuration of each of the CPF 20, the HSS 30, and the NIWF 50 that perform the operation of the present embodiment will be described.

(CPF)

Figure 3:
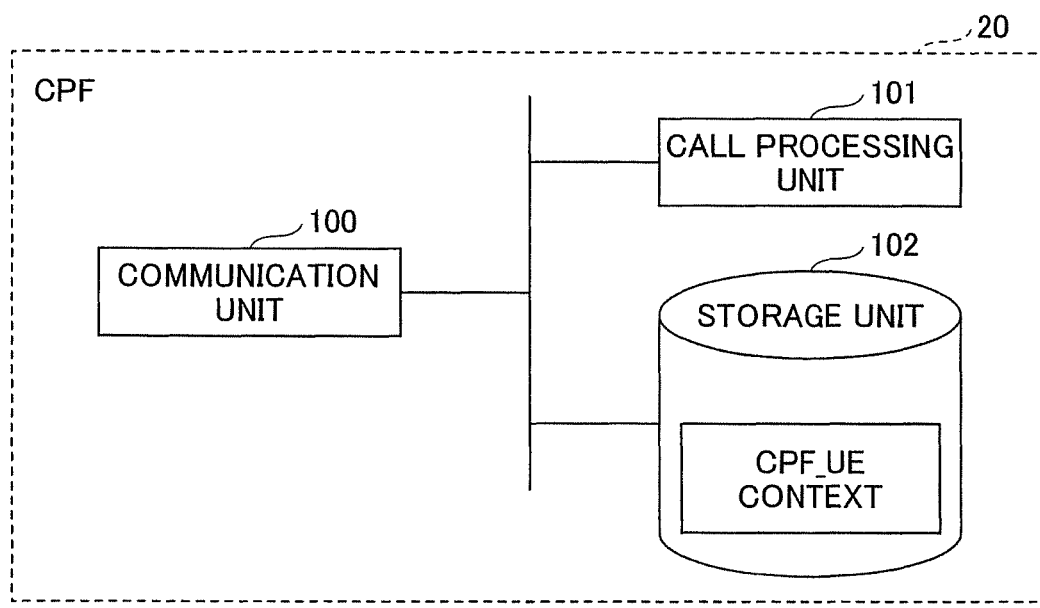
FIG. 3 is a diagram illustrating an exemplary functional configuration of a CPF according to an embodiment.

FIG. 3 is a diagram illustrating an exemplary functional configuration of the CPF according to the embodiment. As illustrated in FIG. 3, the CPF 20 includes a communication unit 100, a call processing unit 101, and a storage unit 102. FIG. 3 illustrates only functional units of the CPF 20 particularly related to the embodiment of the present invention. Further, the functional configuration illustrated in FIG. 3 is merely an example. Any classification or any name may be used as a function classification or a name of a functional unit as long as the operation according to the preset embodiment can be performed.

The communication unit 100 performs various kinds of communication with the AN 10, the HSS 30, the NIWF 50, the DHCP server 60, and the DNS server 70.

The call processing unit 101 has a function of processing the call control signal (the C-plane signal) transmitted or received to or from the AN 10, the HSS 30, the NIWF 50, the DHCP server 60, and the DNS server 70 via the communication unit 100. Further, the call processing unit 101 instructs the UPF 40 to establish the PDU session (logical tunnel) so that communication can be performed between the user equipment UE and the AS 80.

Further, the call processing unit 101 acquires the Ext-ID corresponding to the Int-ID received from the user equipment UE from the HSS 30, and causes the Int-ID received from the user equipment UE and the Ext-ID acquired from the HSS 30 in the CPF_UE context to be associated and stored in the storage unit 102. Further, the call processing unit 101 transmits the Int-ID received from the user equipment UE, the Ext-ID acquired from the HSS 30, and the CPF-ID identifying the CPF 20 to the NIWF 50.

Further, the call processing unit 101 acquires the type of user equipment UE corresponding to the Int-ID included in the session establishment request signal received from the NIWF 50 from the CPF_UE context, and performs the session establishment procedure in accordance with the session establishment procedure corresponding to the acquired type of user equipment UE. The session establishment procedure corresponding to the acquired type of user equipment UE may include a procedure of transmitting the session establishment request signal using the address allocated to the user equipment UE and a procedure of transmitting the session establishment request signal for requesting the user equipment UE to activate the session establishment request procedure triggered by the user equipment UE.

Further, when the session establishment request signal is received from the user equipment UE, the call processing unit 101 may acquire the address allocated to the user equipment UE from the DHCP server 60 and transmit the session establishment response message including the acquired address to the user equipment UE.

Further, when the position update request is received from the user equipment UE, the call processing unit 101 may transmit the CPF-ID (the new CPF-ID) of the CPF 20 to the NIWF 50.

The storage unit 102 stores the CPF_UE context.

(HSS)

Figure 4:
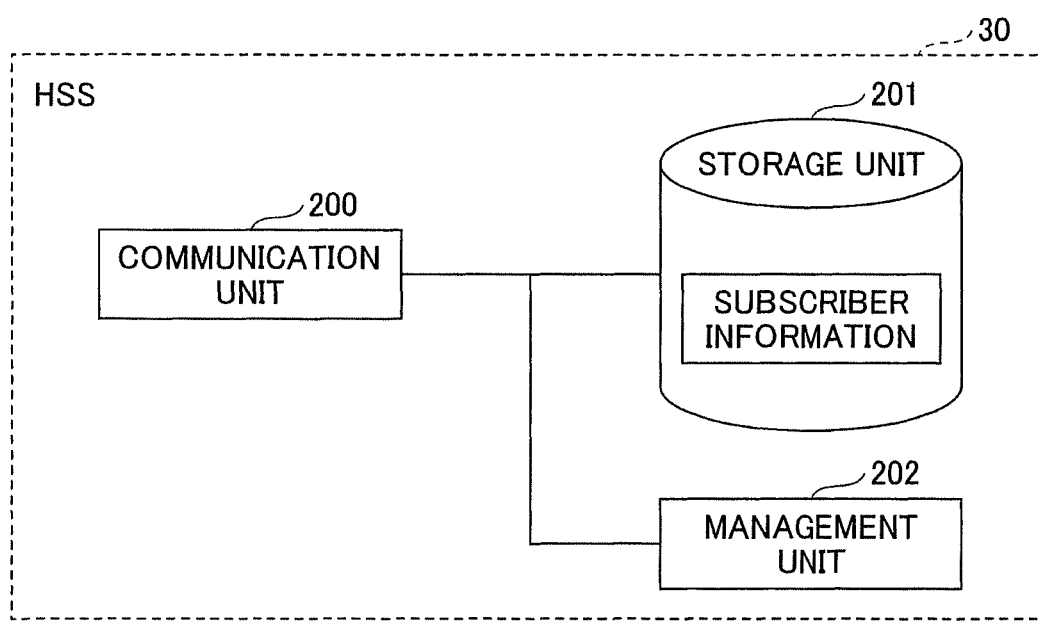
FIG. 4 is a diagram illustrating an exemplary functional configuration of an HSS according to an embodiment.

FIG. 4 is a diagram illustrating an exemplary functional configuration of the HSS according to the embodiment. As illustrated in FIG. 4, the HSS 30 includes a communication unit 200, a storage unit 201, and a management unit 202. FIG. 4 illustrates only functional units of the HSS 30 particularly related to an embodiment of the present invention. Further, the functional configuration illustrated in FIG. 4 is merely an example. Any classification or any name may be used as a function classification or a name of a functional unit as long as the operation according to the preset embodiment can be performed.

The communication unit 200 performs various kinds of communication with the CPF 20 and the NIWF 50. The storage unit 201 stores the subscriber information. The management unit 202 performs various kinds of operations (reading, writing, and the like) on the subscriber information.

(NIWF)

Figure 5:
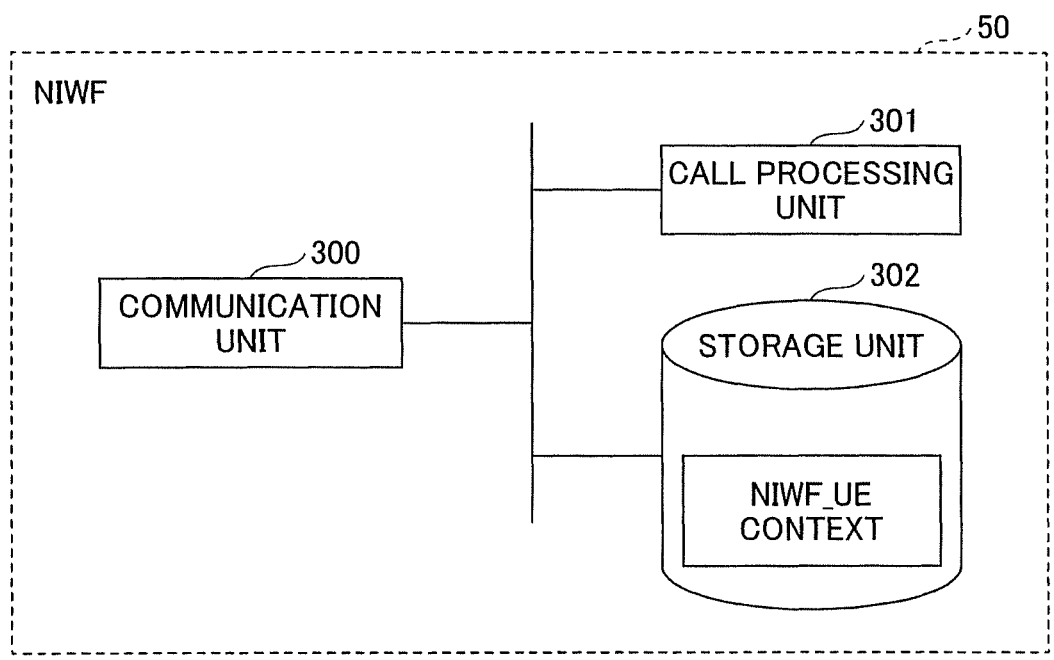
FIG. 5 is a diagram illustrating an exemplary functional configuration of an NIWF according to an embodiment.

FIG. 5 is a diagram illustrating an exemplary functional configuration of the NIWF according to the embodiment. As illustrated in FIG. 5, the NIWF 50 has a communication unit 300, a call processing unit 301, and a storage unit 302. FIG. 5 illustrates only functional units of the NIWF 50 particularly related to an embodiment of the present invention. Further, the functional configuration illustrated in FIG. 5 is merely an example. Any classification or any name may be used as a function classification or a name of a functional unit as long as the operation according to the preset embodiment can be performed.

The communication unit 300 performs various kinds of communication with the CPF 20, the DHCP server 60, the DNS server 70, and the AS 80.

The call processing unit 301 has a function of processing the call control signal (C-plane signal) which is transmitted or received to or from the CPF 20, the DHCP server 60, the DNS server 70, and the AS 80 via the communication unit 300. Further, the call processing unit 301 gives the notification indicating that the attach of the user equipment UE has been completed in the present radio communication system (that is, that the Ext-ID of the user equipment UE has been activated) to the AS 80.

Further, the call processing unit 301 may receive a PDU session establishment request signal including the Ext-ID from the AS 80, acquire the Int-ID and the CPF-ID corresponding to the Ext-ID included in the received PDU session establishment request signal from NIWF_UE context stored in the storage unit 302, and transmit the PDU session establishment request signal including the acquired Int-ID to the CPF 20 corresponding to the acquired CPF-ID.

When the CPF-ID (the new CPF-ID) is received from the CPF 20, the call processing unit 301 may update the CPF-ID (the old CPF-ID) stored in NIWF_UE context with the received CPF-ID (the new CPF-ID).

The storage unit 302 stores NIWF_UE context.

<Hardware Configuration>

In the block diagrams (FIGS. 3 to 5) used in the description of the functional configurations, the blocks of the functional units are illustrated. The functional blocks (configuring units) are implemented by an arbitrary combination of hardware and/or software. A device for implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 6:
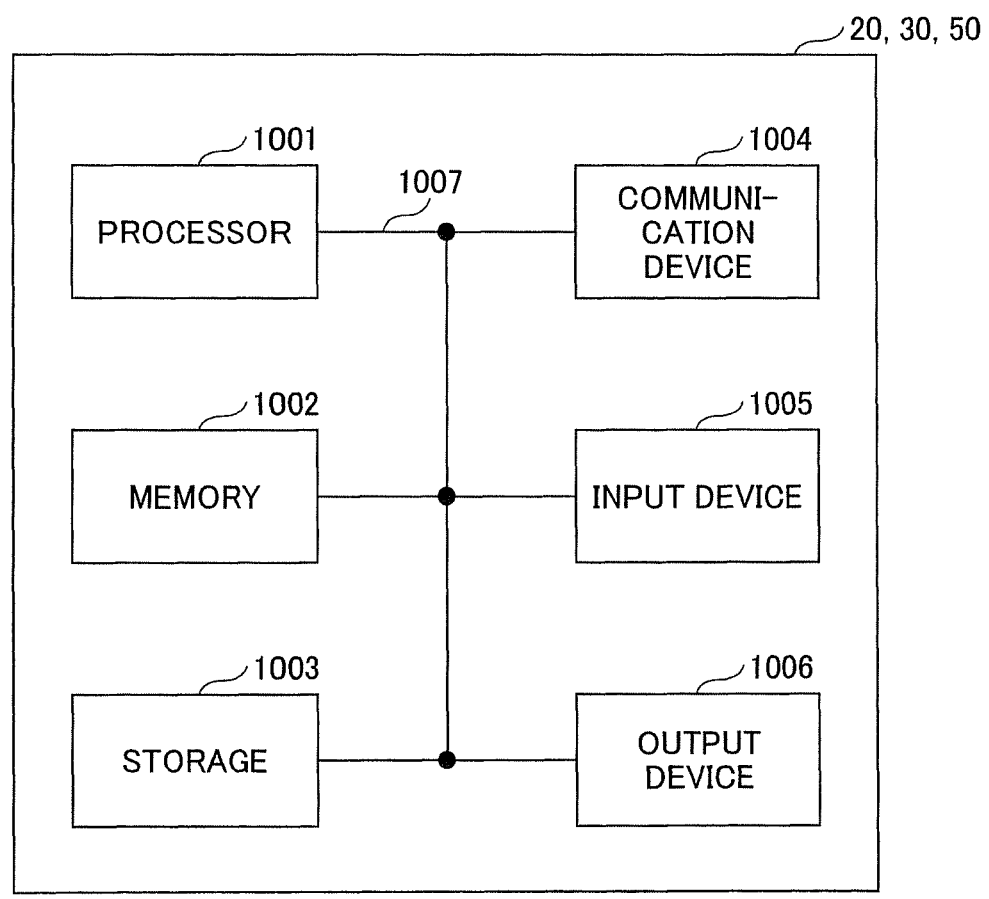
FIG. 6 is a diagram illustrating an example of a hardware configuration of each of a CPF, an HSS, and an NIWF according to an embodiment.

For example, each of the CPF 20, the HSS 30, and the NIWF 50 in one embodiment of the present invention may function as a computer that performs the process of the radio communication method of the present invention. FIG. 6 is a diagram illustrating an example of a hardware configuration of each of the CPF 20, the HSS 30, and the NIWF 50 according to the embodiment. Each of the CPF 20, the HSS 30, and the NIWF 50 may be physically configured as a computer device that includes a processor 1001, a memory 1002, a storage 1003, a communication device 1004, an input device 1005, an output device 1006, and a bus 1007.

In the following description, the term "device" can be replaced with a circuit, a device, a unit, or the like. The hardware configuration of each of the CPF 20, the HSS 30, and the NIWF 50 may be configured to include one or more devices illustrated in the drawing or may be configured without including some devices.

Each function in the CPF 20, the HSS 30, and the NIWF 50 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like. For example, the communication unit 100, the call processing unit 101, and the storage unit 102 of the CPF 20, the communication unit 200, the storage unit 201, and the management unit 202 of the HSS 30, and the communication unit 300, the call processing unit 301, and the storage unit 302 of the NIWF 50 may be implemented by the processor 1001.

Further, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the communication unit 100, the call processing unit 101, and the storage unit 102 of the CPF 20, the communication unit 200, the storage unit 201, and the management unit 202 of the HSS 30, and the communication unit 300, the call processing unit 301, and the storage unit 302 of the NIWF 50 may be implemented by a control program which is stored in the memory 1002 and operates on the processor 1001, or the other functional blocks may be similarly implemented. Various kinds of processes have been described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, or the like which are executable for carrying out the radio communication method according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transceiving device) for performing communication between computers via a wired and/or wireless network and is also referred to as a "network device," a "network controller," a "network card," a "communication module," or the like. For example, the communication unit 100 of the CPF 20, the communication unit 200 of the HSS 30, and the communication unit 300 of the NIWF 50 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integratedly configured (for example, a touch panel).

The respective devices such as the processor 1001 and the memory 1002 are connected via the bus 1007 to communicate information with each other. The bus 1007 may be configured with a single bus or may be configured with different buses between the devices.

Further, the CPF 20, the HSS 30, and the NIWF 50 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

<Processing Procedure>

Next, a specific processing procedure performed in the radio communication system according to the embodiment will be described.

(Attach Process and Ext-ID Activation Process)

Figure 7:
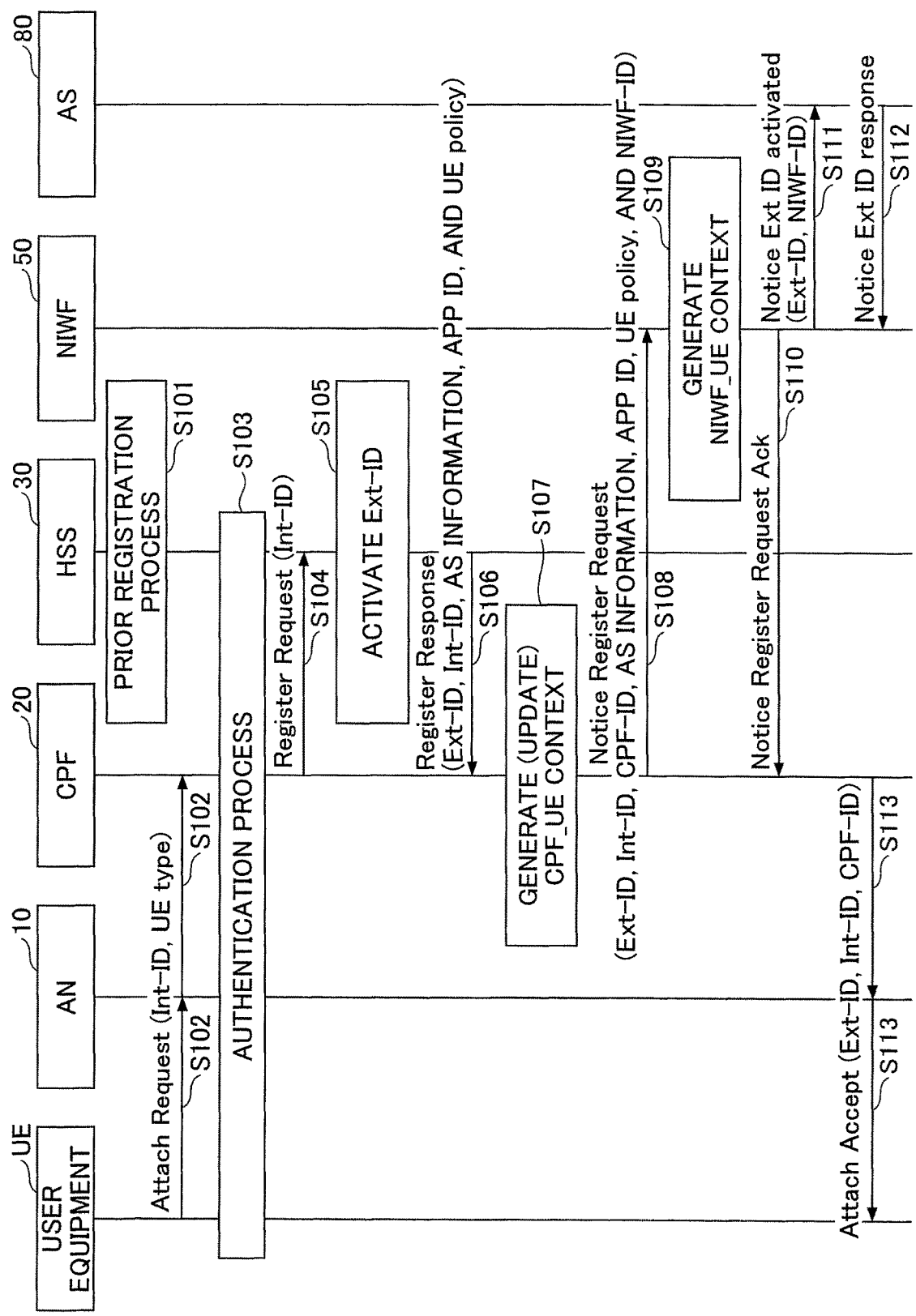
FIG. 7 is a sequence diagram illustrating an example of an attach process and an Ext-ID activation process.

FIG. 7 is a sequence diagram illustrating an example of an attach process and an Ext-ID activation process. A processing procedure in which the CPF_UE context and NIWF_UE context are generated in the CPF 20 and the NIWF 50 in the attach process, and a notification indicating that the attach of the user equipment UE is completed is (that is, that the Ext-ID has been activated) is given to the AS 80 will be described with reference to FIG. 7. In this attach process and the Ext-ID activation process, no UE address is allocated to user equipment UE.

In step S101, the Int-ID, the Ext-ID, and the like are registered in the subscriber information stored in the storage unit 201 of the HSS 30 in advance for each user equipment UE. The prior registration is performed, for example, through a contract management system or the like owned by the operator. FIG. 8 illustrates an example of the subscriber information. "Status" indicates whether or not the Ext-ID has been activated. "Activated" indicates that the attach process is performed, and the Ext-ID is activated, and "Not Activated" indicates that the attach process is not performed, and the Ext-ID is not activated. In an initial state, it is set to "Not Activated." Information uniquely specifying the AS 80 with which the user equipment UE communicates is stored in "AS information." An ID of an application which the user equipment UE uses for communication with the AS 80 is stored in "APP ID." Various kinds of policies applied to the user equipment UE are stored in "UE policy." Various kinds of policies applied to user equipment UE are, for example, a QoS to be applied, a billing method to be applied, a traffic routing method, a congestion control method, and the like.

In step S102, the user equipment UE transmits an Attach Request including the Int-ID and the UE type to the CPF 20. The "UE type" is information indicating the type of user equipment UE (for example, the MTC terminal, the MBB terminal, or the like).

In step S103, an authentication processing for the user equipment UE is performed. In the authentication process, an operator policy may be transmitted from the HSS 30 to the CPF 20.

In step S104, the call processing unit 101 of the CPF 20 transmits a Register Request including the Int-ID.

In step S105, the management unit 202 of the HSS 30 searches for the subscriber information using the Int-ID included in the received Register Request as a key, and acquires the Ext-ID, the AS information, the APP ID, and the UE policy. Further, the management unit 202 changes the "status" column corresponding to the acquired Ext-ID to "Activated."

In step S106, the communication unit 200 of the HSS 30 transmits a Register Response including the Ext-ID, the Int-ID, the AS information, the APP ID, and the UE policy to the CPF 20. In the operator network, when the NIWF 50 used for communication with the AS 80 is fixed (for example, when the number of NIWFs 50 is one), the communication unit 200 of the HSS 30 includes the NIWF-ID of the NIWF 50 in the Register Response, and transmits the resulting Register Response to the CPF 20. The NIWF-ID is an identifier uniquely identifying the NIWF 50 and may be, for example, an IP address of the NIWF 50.

In step S107, the call processing unit 101 of the CPF 20 generates (or updates) the CPF_UE context including the Ext-ID, the Int-ID, the AS information, the APP ID, and the UE policy generated in step S106 and the UE type received in the step S102.

Further, when the NIWF-ID is received in step S106, the call processing unit 101 also stores the received NIWF-ID in the CPF_UE context. On the other hand, when the NIWF-ID is not received in step S106, the call processing unit 101 acquires the NIWF-ID of the NIWF 50 used for communication with the AS 80 from the DNS server 70, and stores the acquired NIWF-ID in the CPF_UE context. The NIWF 50 that communicates with the AS 80 may be uniquely decided by the AS 80 of a communication destination. In this case, the call processing unit 101 queries the NIWF-ID of the NIWF 50 used for communication with the AS 80 by transmitting the AS information to the DNS server 70.

FIG. 9 illustrates an example of the CPF_UE context. Since the "UE address" and the "UPF address" are not decided, nothing is stored at this point.

In step S108, the call processing unit 101 of the CPF 20 transmits a Notice Register Request including the Ext-ID, the Int-ID, the CPF-ID of the CPF 20, the AS information, the APP ID, the UE policy, and the NIWF-ID to the NIWF-ID corresponding to the NIWF-ID received in step S106 or the NIWF-ID received in step S107.

In step S109, the call processing unit 301 of the NIWF 50 generates an NIWF_UE context including the Ext-ID, the Int-ID, the CPF-ID, the AS information, the APP ID, and the UE policy received in step S108. FIG. 10 illustrates an example of the NIWF_UE context.

In step S110, the call processing unit 301 of the NIWF 50 transmits a notice register request Ack to the CPF 20.

In step S111, the call processing unit 301 of the NIWF 50 queries the IP address of the AS 80 by transmitting the AS information received in step S108 to the DNS server 70. Then, the call processing unit 301 of the NIWF 50 transmits a Notice Ext ID activated indicating that the attach of the user equipment UE has been completed (that is, that the Ext-ID has been activated) to the AS 80 of the queried IP address. Further, the Notice Ext ID activated includes the Ext-ID and the NIWF-ID.

In step S112, the AS 80 causes the Ext-ID and the NIWF-ID received in step S111 to be associated and stored in the DB of the AS 80, and transmits a Notice Ext ID response to the NIWF 50.

In step S113, the call processing unit 101 of the CPF 20 transmits an Attach Accept indicating that the attach process has been completed to the user equipment UE. The Attach Accept includes the Ext-ID, the Int-ID, and the CPF-ID.

According to the above-described processing procedure, since the AS 80 can receive the notification indicating that the attach of the user equipment UE has been completed (that is, that the Ext-ID has been activated) from the NIWF 50, the AS 80 can detect the user equipment that has been already attached (that is, the Ext-ID that has been activated). Further, the NIWF-UE context of the NIWF 50 does not include all the Ext-IDs which are registered in the HSS 30 in advance but includes only the Ext-ID of the attached user equipment UE (the activated Ext-ID), and thus the processing load of the NIWF 50 can be reduced.

Modified Example

In the above processing procedure, the AS information and the APP ID are stored in the subscriber information and reported from the HSS 30 to the CPF 20 (S106), but the user equipment UE may include the AS information and the APP ID in the Attach Request (S102) and transmit the resulting Attach Request to the CPF 20. In this case, in step S107, the call processing unit 101 of the CPF 20 may generate (update) the CPF_UE context including the Ext-ID, the Int-ID, the UE policy, and the NIWF-ID received in step S106 and the UE type, the AS information, and the APP ID received in step S102. Accordingly, it is unnecessary to store the AS information and the APP ID in the subscriber information in advance, and the processing load of the HSS 30 can be reduced. Further, it is possible to switch the AS 80 of the connection destination each time the user equipment UE performs the attach.

(PDU Session Establishment Procedure Triggered by External Network)

Figure 11:
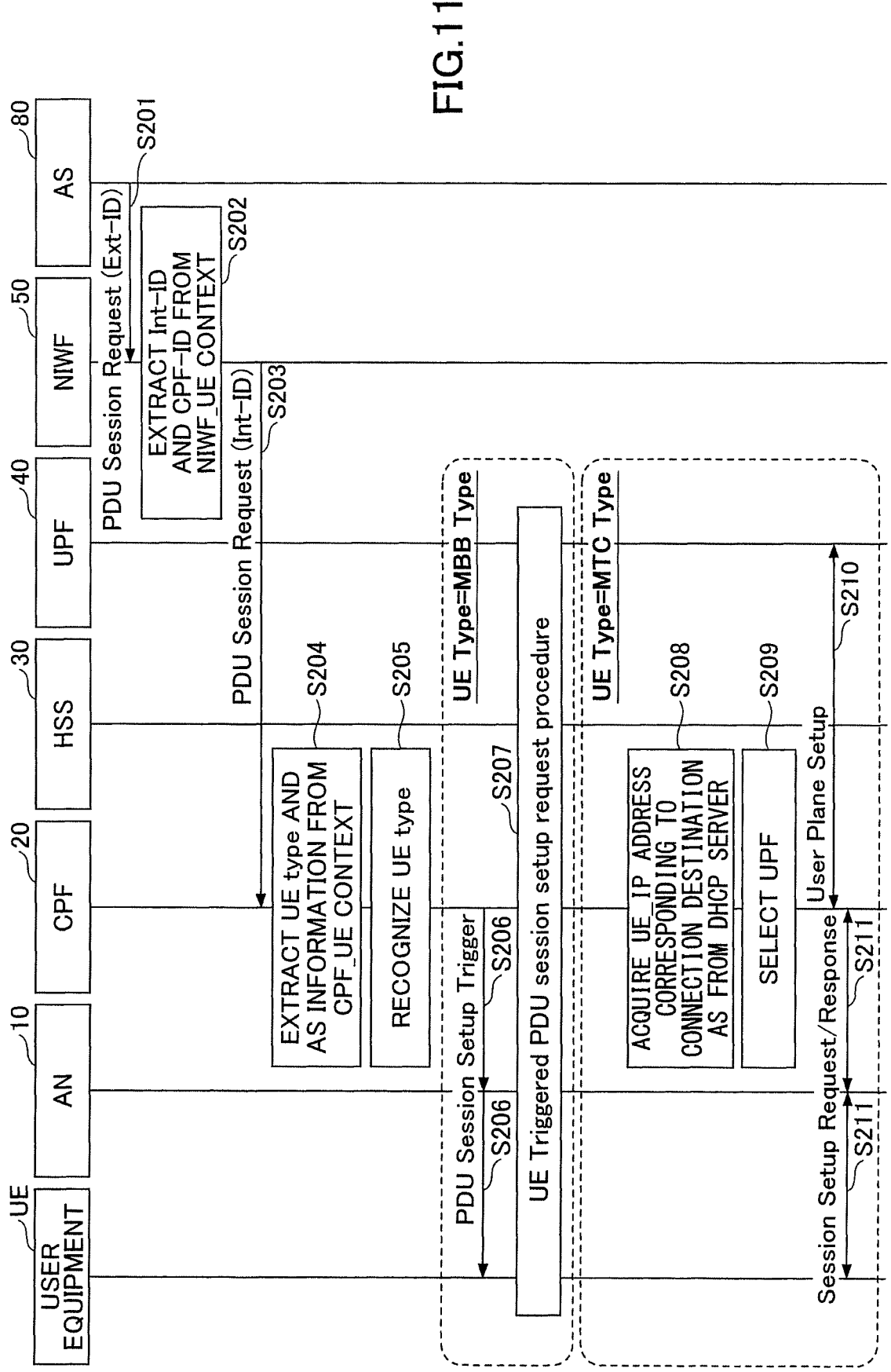
FIG. 11 is a sequence diagram illustrating an example of a PDU session establishment procedure triggered by an external network.

FIG. 11 is a sequence diagram illustrating an example of a PDU session establishment procedure triggered by the external network. A processing procedure when the PDU session is established by transmitting the activated Ext-ID from the AS 80 to the NIWF 50 will be described with reference to FIG. 11.

In step S201, the AS 80 transmits the PDU session request including the activated Ext-ID to the NIWF 50 of the NIWF-ID associated with the Ext-ID.

In step S202, the call processing unit 301 of the NIWF 50 searches for the NIWF_UE context using the Ext-ID included in the PDU session request received in step S201 as a key, and acquires the Int-ID and the CPF-ID.

In step S203, the call processing unit 301 of the NIWF 50 transmits the PDU session request including the Int-ID to the CPF 20 of the CPF-ID acquired in step S202.

In step S204, the call processing unit 101 of the CPF 20 searches for the CPF_UE context using the Int-ID included in the PDU session request received in step S203 as a key, and acquires the UE type and the AS information.

In step S205, the call processing unit 101 of the CPF 20 recognizes the UE type. When the UE type is the MBB Type, the process proceeds to step S206, and when the UE type is the MTC Type, the process proceeds to step S208. In step S205, a next step is decided depending on whether the UE type is MBB type or MTC type, but it is merely an example, and the present invention is not limited thereto. The call processing unit 101 of the CPF 20 may proceed to step S208 when the UE type is a specific type (the user equipment UE that hardly moves is assumed) and may proceed to step S206 when the UE type is any other type.

In step S206, the call processing unit 101 of the CPF 20 transmits a PDU Session Setup Trigger to the user equipment UE. The PDU Session Setup Trigger may be, for example, transmission of a message including information for instructing the user equipment UE to perform the PDU session establishment process triggered by the user equipment UE. The message may be, for example, a paging message.

In step S207, the PDU session establishment process triggered by user equipment UE is performed. The establishment process may be a processing procedure illustrated in FIG. 12 to be described later or a processing procedure different from that of FIG. 12.

In step S208, the call processing unit 101 of the CPF 20 transmits the AS information acquired in step S204 to the DHCP server 60, and acquires the UE address to be allocated to the user equipment UE from the DHCP server 60. The call processing unit 101 of the CPF 20 may store the acquired UE address in the CPF_UE context.

In step S209, the call processing unit 101 of the CPF 20 selects the UPF 40 used for establishment of the PDU session, and stores the address of the selected UPF 40 in the CPF_UE context. The UPF 40 may be selected by any method, but for example, the call processing unit 101 of the CPF 20 may select the UPF 40 used for establishment of the PDU session on the basis of the UE type. In this case, for example, a table in which the UPF 40 to be used is associated with each UE type and held in the storage unit 102 of the CPF 20. Further, the call processing unit 101 of the CPF 20 may select the UPF 40 to be used for establishment of the PDU session on the basis of a position of the user equipment UE, QoS requirements, the UE policy, the operator policy, or the like.

In step S210, the call processing unit 101 of the CPF 20 transmits a User Plane Setup to the selected UPF 40.

In step S211, the call processing unit 101 of the CPF 20 transmits a Session Setup Request to the user equipment UE using the UE address acquired in step S208. The user equipment UE transmits a Session Setup Response to the CPF 20. The PDU session is established through the process of steps S210 and S211. In the radio communication system according to the present embodiment, for the user equipment UE whose UE type is a specific type (user equipment UE that hardly moves is assumed), a message destined for the UE address is assumed to reach the user equipment UE even before the PDU session is established.

Through the processing procedure described above, in the present embodiment, it is possible to implement the PDU session establishment procedure triggered by external network. Further, when the PDU session request signal including the Ext-ID is received from the AS 80, the NIWF 50 need not transmit the query about the Int-ID to the HSS 30, and thus the processing load of the HSS 30 can be reduced. Further, it is possible to switch the PDU session establishment method on the basis of the type of user equipment UE, (PDU Session Establishment Procedure Triggered by UE)

Figure 12:
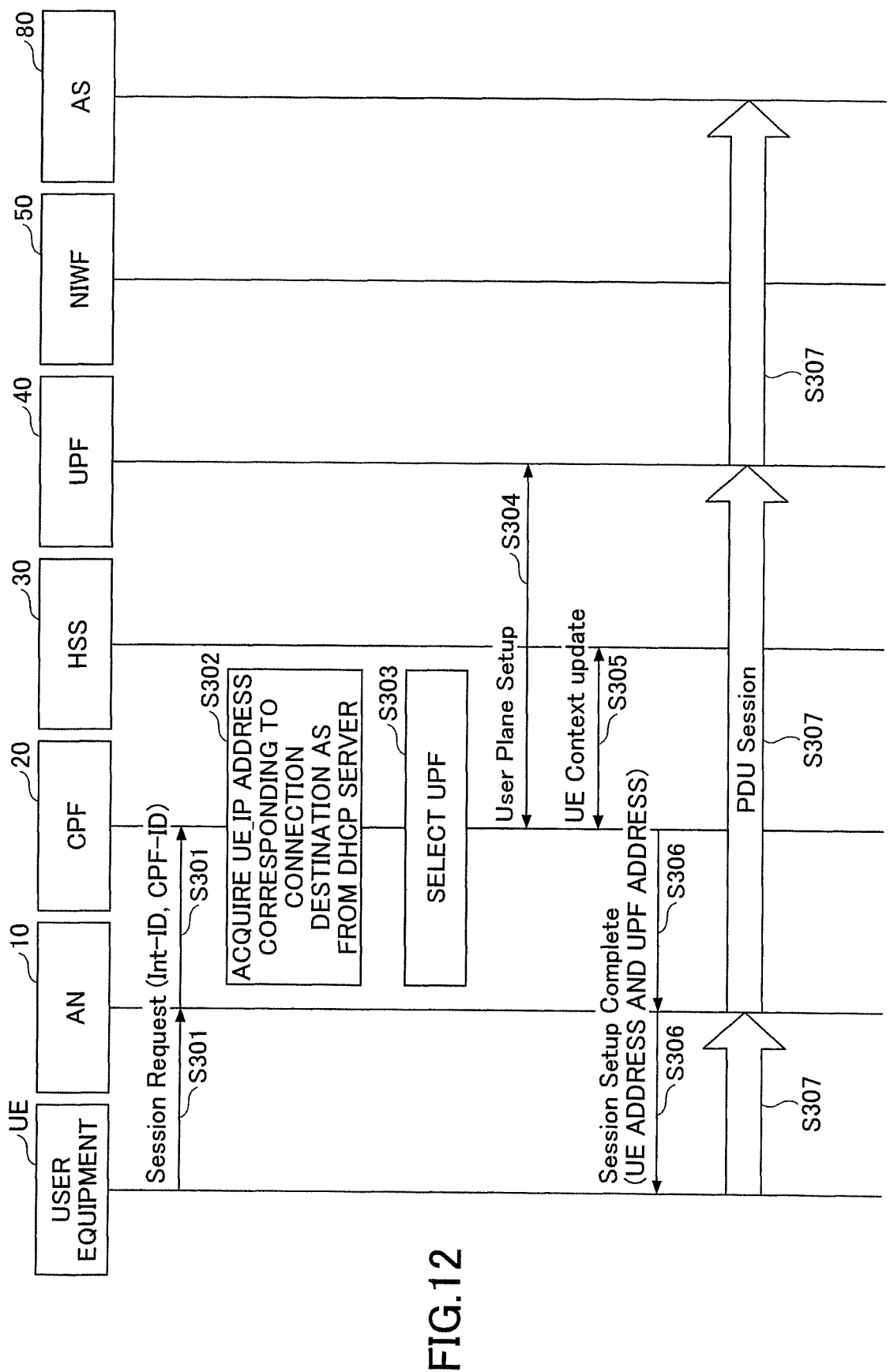
FIG. 12 is a sequence diagram illustrating an example of a PDU session establishment procedure triggered by a UE.

FIG. 12 is a sequence diagram illustrating an example of a PDU session establishment procedure triggered by the UE. A processing procedure when the user equipment UE which has completed the attach process makes a PDU session establishment request will be described with reference to FIG. 12.

In step S301, the user equipment UE transmits a session request including the Int-ID and the CPF-ID to the CPF 20.

In step S302, the call processing unit 101 of the CPF 20 searches for the CPF_UE context using the Int-ID as a key, and acquires the AS information. Then, the call processing unit 101 transmits the AS information to the DHCP server 60 and acquires the UE address allocated to the user equipment UE from the DHCP server 60. The call processing unit 101 of the CPF 20 stores the acquired UE address in the CPF_UE context.

The UE address allocation method may be decided in accordance with the policy of the operator. For example, the UE address may be allocated on the basis of the position of the user equipment UE, or a fixed UE address (which may be provided from the HSS, for example) may be allocated.

In step S303, the call processing unit 101 of the CPF 20 selects the UPF 40 to be used for establishment of the PDU session. A specific selection method may be the same as step S209 in FIG. 11.

In step S304, the call processing unit 101 of the CPF 20 transmits the User Plane Setup to the selected UPF 40.

In step S305, the call processing unit 101 of the CPF 20 transmits the UE address allocated to the user equipment UE acquired in step S302, the information related to the UPF 40 selected in step S303, and the like to the HSS 30 in order to update the UE context managed on the HSS 30 side.

In step S306, the call processing unit 101 of the CPF 20 transmits a Session Setup Complete including the UE address and the UPF address to the user equipment UE.

In step S307, the user equipment UE starts communication with the AS 80 using the established PDU session.

Through the processing procedure described above, in the present embodiment, it is possible to establish the PDU session triggered by the user equipment UE. Further, it is possible to perform the allocation of the UE address according to the AS 80 of the connection destination of the user equipment UE.

(Position Update Procedure)

Figure 13:
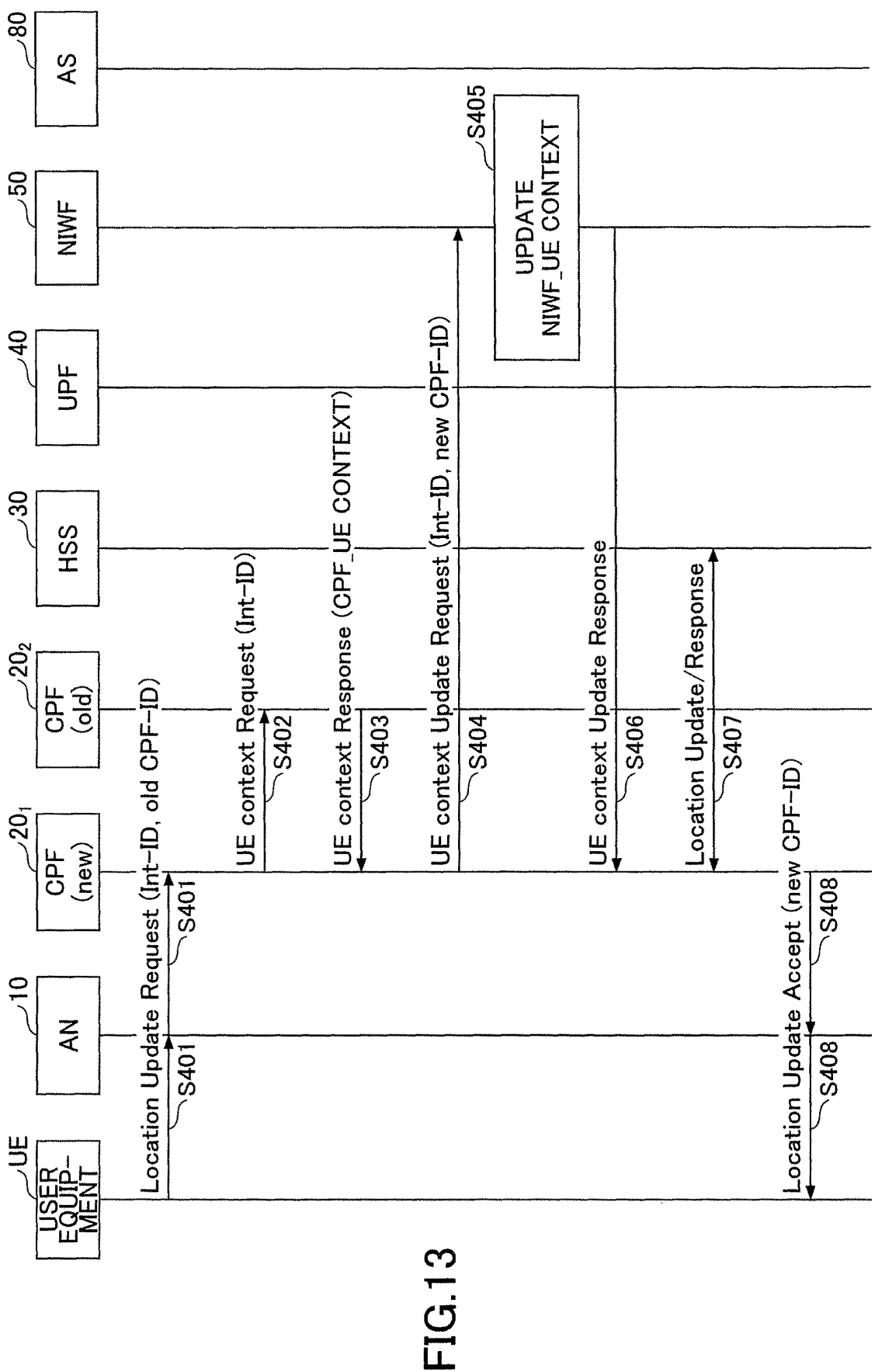
FIG. 13 is a sequence diagram illustrating an example of a position update procedure of user equipment.

FIG. 13 is a sequence diagram illustrating an example of a position update procedure of the user equipment UE. A processing procedure when the CPF 20 to which the user equipment UE is attached is changed will be described with reference to FIG. 13.

In step S401, a CPF $20_1$ (a new CPF $20_1$) receives a Location Update Request including the Int-ID of the user equipment UE and the CPF-ID of the CPF $20_2$ (an old CPF $20_2$) to which the user equipment UE has been attached previously via the AN 10.

In step S402, the call processing unit 101 of the new CPF $20_1$ transmits a UE context Request including the Int-ID to the old CPF $20_2$ in order to acquire the CPF_UE context from the old CPF $20_2$.

In step S403, the call processing unit 101 of the old CPF $20_2$ transmits the CPF_UE context corresponding to the Int-ID to the new CPF $20_1$. The call processing unit 101 of the new CPF $20_1$ stores the received the CPF_UE context in the storage unit 102.

In step S404, the call processing unit 101 of the new CPF $20_1$ transmits a UE context Update Request including the Int-ID and the CPF-ID (the new CPF-ID) of the new CPF $20_1$ to the NIWF 50 corresponding to the NIWF-ID included in the received the CPF_UE context.

In step S405, the call processing unit 301 of the NIWF 50 updates the CPF-ID (the old CPF-ID) in the NIWF_UE context to the received CPF-ID (the new CPF-ID).

In step S406, the call processing unit 301 of the NIWF 50 transmits a UE context Update Response to the new CPF $20_1$. Further, when the NIWF-ID of the NIWF 50 is changed, the call processing unit 301 of the NIWF 50 may include the changed NIWF-ID in the UE context Update Response and transmit the resulting UE context Update Response.

In step S407, the call processing unit 101 of the new CPF $20_1$ transmits a Location Update including the Int-ID and the CPF-ID (the new CPF-ID) of the new CPF $20_1$ to the HSS 30. The management unit 202 of the HSS 30 transmits a Location Update Response to the new CPF $20_1$.

In step S408, the call processing unit 101 of the new CPF $20_1$ transmits a Location Update Accept including the CPF-ID (the new CPF-ID) of the new CPF $20_1$ itself to the user equipment UE.

Through the above-described processing procedure, when the PDU session establishment procedure triggered by the external network is activated, the NIWF 50 can transmit the PDU session establishment request signal (the PDU session request) to the appropriate CPF 20 according to the movement of the user equipment UE.

CONCLUSION

According to the embodiment, provided is a radio communication system including user equipment, a call control device that processes a signal used for call control, a subscriber management device that manages subscriber information, and a connection device that establishes a connection with an application server, wherein the subscriber management device includes a subscriber information storage unit that stores subscriber information that associates a first identifier for identifying the user equipment in the radio communication system with a second identifier for identifying the user equipment in the application server, wherein the call control device includes a first context storage unit that stores first context information, and a first communication processing unit that acquires the second identifier corresponding to the first identifier received from the user equipment from the subscriber management device, causes the first identifier received from the user equipment and the second identifier acquired from the subscriber management device to be associated and stored in the first context information, and transmits the first identifier received from the user equipment, the second identifier acquired from the subscriber management device, and a call control device identifier for identifying the call control device to the connection device, and wherein the connection device includes a second context storage unit that stores second context information that associates the first identifier, the second identifier, and the call control device identifier received from the call control device, and a second communication processing unit that reports, to the application server, that the second identifier is activated to the application server. According to the radio communication system, a technique capable of appropriately establish the PDU session triggered from the application server side is provided.

Further, when a session establishment request signal including the second identifier is received from the application server, the second communication processing unit may acquire the first identifier corresponding to the second identifier included in the received session establishment request signal and the call control device identifier from the second context information stored in the second context storage unit and transmit the session establishment request signal including the acquired first identifier to the call control device corresponding to the acquired call control device identifier, and the first communication processing unit may perform a session establishment procedure when the session establishment request signal is received from the connection device. Accordingly, it is possible to implement the PDU session establishment procedure triggered by external network. Further, it is possible to reduce the load on the HSS 30. Further, the AS 80 side can detect the user equipment that has already performed the attach (that is, the Ext-ID that has been activated).

The first identifier and a type of user equipment may be associated in the first context information, and the first communication processing unit may acquire the type of user equipment corresponding to the first identifier included in the session establishment request signal received from the connection device from the first context information and perform the session establishment procedure in accordance with the session establishment procedure corresponding to the acquired type of user equipment. Accordingly, it is possible to switch the PDU session establishment procedure on the basis of the type of user equipment UE.

The session establishment procedure corresponding to the acquired type of user equipment UE may include a procedure of transmitting the session establishment request signal using the address allocated to the user equipment UE and a procedure of transmitting the session establishment request signal for requesting the user equipment UE to activate the session establishment request procedure triggered by the user equipment UE. Accordingly, it is possible to establish the PDU session by a simple method on the basis of the type of user equipment UE.

Further, when the session establishment request signal is received from the user equipment, the first communication processing unit may acquire an address to be allocated to the user equipment and transmits a session establishment response message including the acquired address to the user equipment. Accordingly, it is possible to implement the PDU session establishment procedure triggered by user equipment UE.

Further, when a position update request is received from the user equipment, the first communication processing unit may transmit a new call control device identifier corresponding to the call control device having the first communication processing unit to the connection device, and the second communication processing unit updates the call control device identifier stored in the second context information with the new call control device identifier. Accordingly, it is possible to implement the position update procedure of the user equipment UE.

According to the embodiment, there is provided a radio communication method to be performed in a radio communication system including user equipment, a call control device that processes a signal used for call control, a subscriber management device that manages subscriber information, and a connection device that establishes a connection with an application server, and the radio communication method includes storing, by the subscriber management device, subscriber information that associates a first identifier for identifying the user equipment in the radio communication system with a second identifier for identifying the user equipment in the application server in a storage unit; storing, by the call control device, first context information in the storage unit; acquiring, by the call control device, the second identifier corresponding to the first identifier received from the user equipment from the subscriber management device, causing the first identifier received from the user equipment and the second identifier acquired from the subscriber management device to be associated and stored in the first context information, and transmitting the first identifier received from the user equipment, the second identifier acquired from the subscriber management device, and a call control device identifier for identifying the call control device to the connection device; storing, by the connection device, second context information that associates the first identifier, the second identifier, and the call control device identifier received from the call control device in the storage unit; and reporting, to the application server by the connection device, that the second identifier is activated to the application server. According to the radio communication method, a technique capable of appropriately establish the PDU session triggered from the application server side is provided.

<Supplement of Embodiment>

Notification of information is not limited the aspect/embodiment described in the present specification any may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, an RRC message may be referred to as the RRC signaling.

Furthermore, the RRC message may be an RRC connection setup (RRC Connection Setup) message, a RRC connection reconfiguration (RRC Connection Reconfiguration) message, or the like, for example.

The Attach process is also referred to as a "registration process."

Each aspect and embodiment of the present invention may be applied to Long Term Evolution (LTE), LTE-advanced (LTE-A), SUPER 3G, IMT-Advanced, 4G, 5G, Future Radio Access (ERA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended on the basis of these standards.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The processing procedures, the sequences, and the like of the respective aspects/embodiments described in this specification may be changed in order, provided that there is no contradiction. For example, the method described in this specification presents elements of various steps in an exemplary order and is not limited to the presented specific order.

Input and output Information and the like may be stored in a specific location (for example, a memory) or may be managed by a management table. The input and output information and the like may be overwritten, updated, or rewritten. The output information and the like may be deleted. The input information and the like may be transmitted to another apparatus.

Each aspect/embodiment described in this specification may be used alone, may be used in combination, or may be switched in accordance with execution. Further, a notification of predetermined information (for example, a notification indicating "being X") is not limited to one which is performed explicitly and may be performed implicitly (for example, a notification of predetermined information is not given).

The terms "determine (determining)" and "decide (determining)" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The present invention is described above in detail; however, it is apparent to a person ordinarily skilled in the art that the present invention is not limited to the embodiments described in this specification. The present invention may be implemented as a modified embodiment and an altered embodiment without departing from the gist and scope of the present invention defined by the descriptions of the claims. Therefore, the description of this specification is intended to be exemplary and does not have any restrictive meaning to the present invention.

The terms "system" and "network" used in this specification are used interchangeably.

The user equipment UE may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms, by a person ordinarily skilled in the art.

A phrase "on the basis of" used in this specification is not limited to "on the basis of only" unless otherwise stated. In other words, a phrase "on the basis of" means both "on the basis of only" and "on the basis of at least."

Information, signals, etc., described in the present specification may be represented using any of various other techniques. For example, data, instructions, commands, information, signals, bits, symbols, chips, etc., mentioned in the entire description may be represented by a voltage, a current, electromagnetic waves, a magnetic field or magnetic particles, an optical field or photons, or any combination thereof.

Any reference to an element using a designation such as "first," "second," or the like used in this specification does not generally restrict quantities or an order of those elements. Such designations can be used in this specification as a convenient method of distinguishing between two or more elements. Thus, reference to the first and second elements does not mean that only two elements can be adopted there, or first element must precede the second element in a certain form.

In the present disclosure, for example, when an article such as "a," "an," or "the" in English is added by a translation, such an article is assumed to include the plural unless it is obviously indicated that such an article does not include the plural.

In the above embodiment, the CPF 20 is an example of a call control device. The HSS 30 is an example of a subscriber management device. The NIWF 50 is an example of a connection device. The Int-ID is an example of a first identifier. The Ext-ID is an example of a second identifier. The CPF_UE context is an example of first context information. The NIWF_UE context is an example of second context information. The communication unit 100 and the call processing unit 101 are examples of a first communication processing unit. The communication unit 300 and the call processing unit 301 are examples of a second communication processing unit.

This international patent application is based on and claims priority to Japanese Patent Application No. 2016-131698 filed on Jul. 1, 2016, and the entire content of Japanese Patent Application No. 2016-131698 is incorporated herein by reference.

LIST OF REFERENCE SYMBOLS

UE user equipment
10 AN
20 CPF
30 HSS
40 UPF
50 NIWF
60 DHCP server
70 DNS server
80 AS
100 communication unit
101 call processing unit
102 storage unit
200 communication unit
201 storage unit
202 management unit
300 communication unit
301 call processing unit
302 storage unit
1001 processor
1002 memory
1003 storage
1004 communication device
1005 input device
1006 output device

The invention claimed is:

1. A radio communication system, comprising:
user equipment;
a call control device that processes a signal used for call control;
a subscriber management device that manages subscriber information; and
a connection device that establishes a connection with an application server,
wherein the subscriber management device includes a subscriber information storage unit that stores subscriber information that associates a first identifier for identifying the user equipment in the radio communication system with a second identifier for identifying the user equipment in the application server,
wherein the call control device includes
a first context storage unit that stores first context information and
a first communication processing unit that acquires the second identifier corresponding to the first identifier received from the user equipment from the subscriber management device, causes the first identifier received from the user equipment and the second identifier acquired from the subscriber management device to be associated and stored in the first context information, and transmits the first identifier received from the user equipment, the second identifier acquired from the subscriber management device, and a call control device identifier for identifying the call control device to the connection device, and
wherein the connection device includes
a second context storage unit that stores second context information that associates the first identifier, the second identifier, and the call control device identifier received from the call control device, and
a second communication processing unit that reports, to the application server, that the second identifier is activated.

2. The radio communication system according to claim 1, wherein when a session establishment request signal including the second identifier is received from the application server, the second communication processing unit acquires the first identifier corresponding to the second identifier included in the received session establishment request signal and the call control device identifier from the second context information stored in the second context storage unit, and transmits the session establishment request signal including the acquired first identifier to the call control device corresponding to the acquired call control device identifier, and
the first communication processing unit performs a session establishment procedure when the session establishment request signal is received from the connection device.

3. The radio communication system according to claim 2, wherein the first identifier and a type of user equipment are associated in the first context information, and
the first communication processing unit acquires the type of user equipment corresponding to the first identifier included in the session establishment request signal received from the connection device from the first context information, and performs the session establishment procedure in accordance with the session establishment procedure corresponding to the acquired type of user equipment.

4. The radio communication system according to claim 3, wherein, when the session establishment request signal is received from the user equipment, the first communication processing unit acquires an address to be allocated to the user equipment and transmits a session establishment response message including the acquired address to the user equipment.

5. The radio communication system according to claim 3, wherein, when a position update request is received from the user equipment, the first communication processing unit transmits a new call control device identifier corresponding to the call control device having the first communication processing unit to the connection device, and
the second communication processing unit updates the call control device identifier stored in the second context information with the new call control device identifier.

6. The radio communication system according to claim 2, wherein, when the session establishment request signal is received from the user equipment, the first communication processing unit acquires an address to be allocated to the user equipment and transmits a session establishment response message including the acquired address to the user equipment.

7. The radio communication system according to claim 2, wherein, when a position update request is received from the user equipment, the first communication processing unit transmits a new call control device identifier corresponding to the call control device having the first communication processing unit to the connection device, and the second communication processing unit updates the call control device identifier stored in the second context information with the new call control device identifier.

8. The radio communication system according to claim 1, wherein, when the session establishment request signal is received from the user equipment, the first communication processing unit acquires an address to be allocated to the user equipment and transmits a session establishment response message including the acquired address to the user equipment.

9. The radio communication system according to claim 8, wherein, when a position update request is received from the user equipment, the first communication processing unit transmits a new call control device identifier corresponding to the call control device having the first communication processing unit to the connection device, and the second communication processing unit updates the call control device identifier stored in the second context information with the new call control device identifier.

10. The radio communication system according to claim 1, wherein, when a position update request is received from the user equipment, the first communication processing unit transmits a new call control device identifier corresponding to the call control device having the first communication processing unit to the connection device, and the second communication processing unit updates the call control device identifier stored in the second context information with the new call control device identifier.

11. A radio communication method to be performed by a radio communication system including user equipment, a call control device that processes a signal used for call control, a subscriber management device that manages subscriber information, and a connection device that establishes a connection with an application server, the radio communication method comprising:

storing, by the subscriber management device, subscriber information that associates a first identifier for identifying the user equipment in the radio communication system with a second identifier for identifying the user equipment in the application server in a storage unit;

storing, by the call control device, first context information in the storage unit;

acquiring, by the call control device, the second identifier corresponding to the first identifier received from the user equipment from the subscriber management device, causing the first identifier received from the user equipment and the second identifier acquired from the subscriber management device to be associated and stored in the first context information, and transmitting the first identifier received from the user equipment, the second identifier acquired from the subscriber management device, and a call control device identifier for identifying the call control device to the connection device;

storing, by the connection device, second context information that associates the first identifier, the second identifier, and the call control device identifier received from the call control device in the storage unit; and reporting, to the application server by the connection device, that the second identifier is activated.

\* \* \* \* \*